Oct. 11, 1949.  R. A. MEASE  2,484,417
SAW FILING GUIDE
Filed May 24, 1946  2 Sheets-Sheet 1
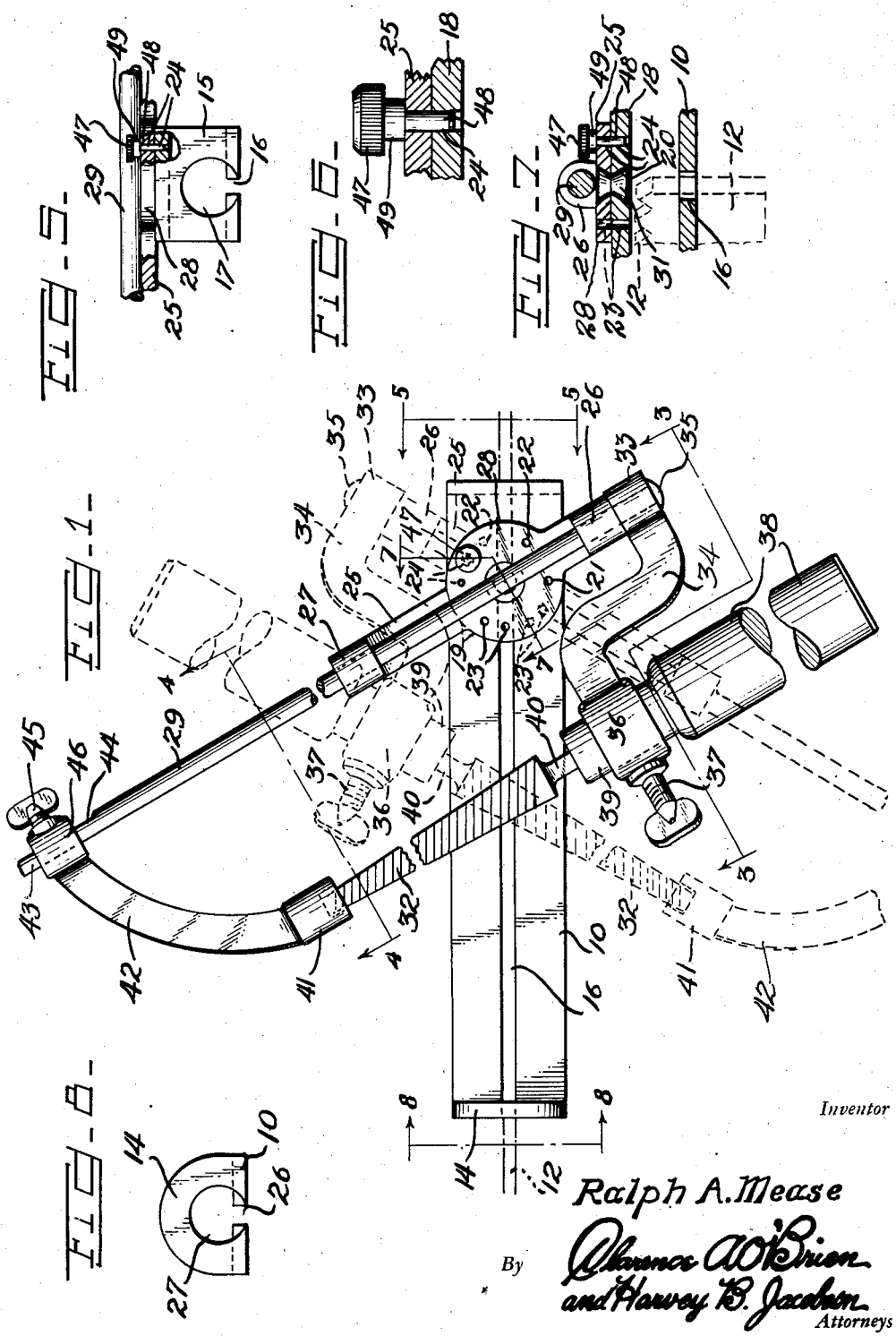
Inventor
Ralph A. Mease

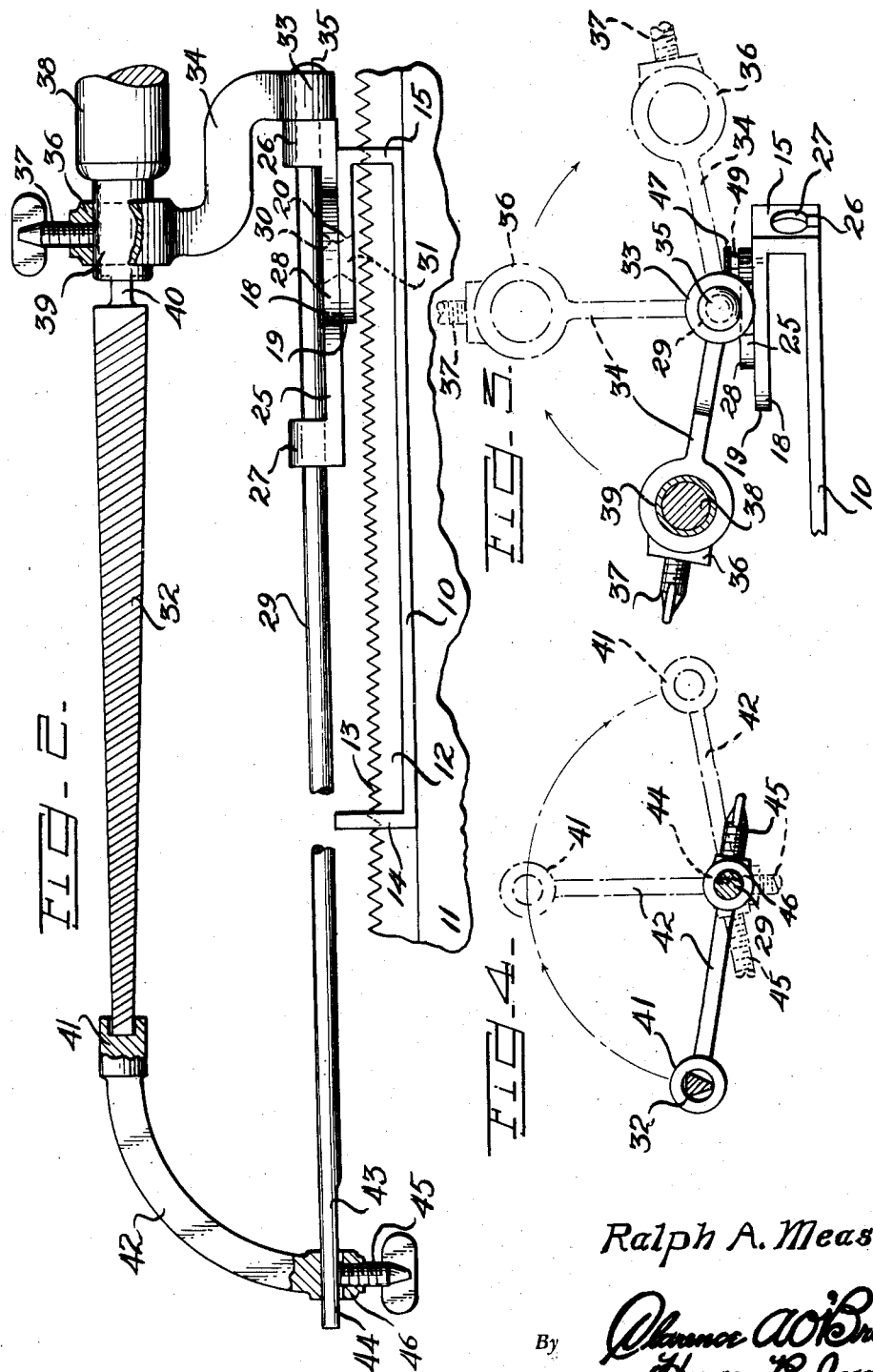

Patented Oct. 11, 1949

2,484,417

UNITED STATES PATENT OFFICE 2,484,417

SAW FILING GUIDE

Ralph A. Mease, East St. Louis, Ill.

Application May 24, 1946, Serial No. 671,942

1 Claim. (Cl. 76—31)

This invention relates to a filing guide for saws, having means to support a file on a saw clamp and for moving the same back and forth over the teeth of the saw, which are swaged or filed from opposite side of the saw on exactly the desired angle or pitch in accordance with the reverse bevel or hook of the saw teeth, and to mount the same or the guide thereof for the file on a point in the exact center of the teeth with respect to the thickness of the blade, so that perfect hand positions on opposite sides is obtainable, to insure accurate filing of the saw teeth.

Another object of the invention is to provide a simple, light and economical saw guide, which is provided with a base, upon which the file holder is pivotally and slidably mounted, so that the same may be swung to opposite sides whereby every other tooth may be filed from opposite sides of the saw, instead of requiring that all teeth be filed from one side, and in which the slidable support of the file is arranged to accommodate files of different sizes or lengths, and mounted to turn in angular positions at opposite sides of the saw, so as to be set and give the exact angular pitch so that the exact reverse bevel of the saw teeth, commonly termed the hook, is obtainable, without leaving the same to guesswork or accuracy determined by experience as in hand saw filing or requiring that the saw clamp be reversed in position or turned end for end without the person doing the filing changing position, the guide being so mounted that it is pivoted on the exact center of the teeth so that when operating from either side of the saw, the same angular pitch is maintained with alternate teeth bevelled in opposite directions.

Another object of the invention is to provide a mounting for the file by which the same may be set to be moved back and forth in the filing operation and exactly set at the required pitch when reversed angularly to either side of the saw so that the angular pitch will be accurately maintained to all teeth which are filed from one side, as well as the alternate teeth which are filed from the opposite side, or otherwise, in different types of saws or saw teeth.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of a saw filing guide constructed in accordance with the invention, and showing the device in reverse positions for filing the saw teeth at opposite sides of the saw.

Figure 2 is a side elevation of the device with the file in a raised position.

Figure 3 is a sectional view taken on the line 3—3 of Figure 1.

Figure 4 is a sectional view taken on the line 4—4 of Figure 1.

Figure 5 is a fragmentary sectional elevation taken on the plane of the line 5—5 of Figure 1.

Figure 6 is an enlarged detailed sectional elevation showing the means for holding the saw guide at the required pitch at either side of the saw.

Figure 7 is a sectional view taken on the line 7—7 of Figure 1, and

Figure 8 is an end elevation taken on the plane of the line 8—8 of Figure 1.

Referring to the drawings in detail, in which like reference characters designate corresponding parts throughout the several views, the device includes a base 10 adapted to be mounted on the top of a saw clamp 11, which may be of any approved or desired type, the most common type of saw clamp used being pivoted at the base so that the saw can be turned end for end without the man filing the same changing position. The base is designed to rest on the top edge of the saw clamp and straddle of the blade indicated at 12 having the usual teeth 13, usually bevelled alternately from opposite sides at the required pitch or hook. Of course, it is to be understood that the type of saw to be filed may include any of the well-known types with different arrangements of the teeth for cross cut and rip sawing. As shown, the base 10 includes a flat member or strip one end of which is provided with an upturned right angular portion 14 and the other with an end portion 15, both of which are provided at the bottom with a slot 16 through the base strip between said ends and in perfect alignment centrally and longitudinally thereof and opening into circular openings 17 into which the tooth edge portion of the saw projects so that the slot edge-wise in this base at the ends thereof clears the saw blade sufficiently to permit easy sliding while the saw guide is adapted to slide along the tooth edge of the saw by resting on the top edge of the saw clamp and straddle of the blade. It is to be understood that the guide may be used in connection with any saw clamp but of course, the full-length wood clamp is more desirable and the representation of the top of the saw clamp indicated at 11, is to include any type of saw clamp. The slot 16 thus is disposed centrally of the width of the base running longitudinally thereof and communicating at its ends with the enlarged circular openings in the vertical end portions 14 and 15, forming substantially T-shaped slots, or what is commonly known as key-hole or bayonet slots. The end 15 which is parallel to the end 14, and forms a substantially elongated U-shaped member comprising the base, has an inwardly extending horizontal overhanging portion 18 parallel to the base proper or intermediate bottom strip 16 and terminating in a rounded or convex inner end if desired, as indicated at 19 concentric to a center or vertical pivot axis defined by the center of a downwardly bevelled pivot aperture 20 therethrough. The portion 18 concentrically around the pivot center or axis is provided with a series of matched holes 21 and 22 arranged upon opposite sides of the center of the slot 16 equidistantly on each side of the center of axis, and at the concentric arcuate or convexedly rounded end 19, also the same radial distance from said center and therefore concentric thereto, at each side, with a plurality, preferably pairs of similar holes 23 and 24 spaced apart at angular distance such as to give the required pitch for the bevel of the teeth standard in different types of saws and accurately conforming thereto. Pivotally mounted for horizontal swinging movement upon the overhanging supporting portion 18 is a guide member proper 25, which like the base 10, may be formed as a casting or of suitable stamped sheet material, and is formed at its ends with horizontally apertured guide lugs or eyes consisting of an outer eye or sleeve 26 and an inner sleeve or eye 27 with the apertures or holes therethrough accurately aligned horizontally and the intermediate portion forming therewith a substantially U-shaped member and a connecting portion between the eyes or guide sleeves 26 and 27. The intermediate portion is also formed with a circular part 28 with arcuate projections on either side of the side edges thereof, so that the normal circular part exactly corresponds in radius and diameter with the width and end 19 of the overhanging part 18 of the base 10 and is provided with a similar series of holes corresponding to the holes 21, 22, 23 and 24 previously described.

The guide sleeves or eyes 26 and 27 are designed to receive for free sliding movement horizontally, a circular slide rod 29 which is adapted to be swung with the guide member 25 on the pivot axis thereof, preferably formed by providing the circular portion 28 with an upwardly enlarged opening 30 at the axial center of or in alignment with the opening 20 so as to receive an oppositely bevelled rivet or pin 31 forming the pivot of the guide member 25, the pivot axis or center of which is exactly in the center of the slot 16 and thus of the saw blade 12 with respect to its thickness, and equidistantly from the side edges of the base 10 and the parts 18 and 25, so that irrespective of the angular position of the pivoted support or guide member 25, the slide rod 29 and the file 32 are always in direct line with each other and at the proper pitch to agree with the exact reverse bevel or hook of the teeth 13 so that the latter may be properly filed perfectly at the required angle or bevel and the same relative position of the base 10 to the saw blade 12 maintained with the end 15 of the base 10 to which the guide means 25 is pivoted, always toward the point or tip end of the saw and the end 14 always toward the handle of the saw.

The file holder, includes the rod 29 which is freely slidable in the guideways produced by the sleeves or eyes 26 and 27 and projects therefrom directly over the longitudinal center of the guide 25 as well as the base 10 and upturned ends 14 and 15 thereof, as well as the saw 12. One end of the rod 29 mounts the pivot ear or sleeve 33 of an angular arm 34 shown as of ogee or reversed curve formation, to rigidly mount the arm 34 on the rod 29, or to fix the arm to the rod while the latter can turn in the pivot ears or sleeves 26 and 27 forming bearings or guides for the rod, the adjacent end of the rod being up-set or riveted, as at 35, or otherwise formed with an enlargement or stop to retain the arm 34 thereon. The upper end or outer free end of the arm 34 is provided with a sleeve 36 which is thus off-set inwardly from the end mounted on the rod 29 and fixed to or formed thereon as desired, and is adapted to take a set screw 37 shown as a wing screw in a radial threaded bore at the top thereof. The file 32 has a handle 38, the ferrule 39 of which extends through the sleeve 36 for adjustment lengthwise and adapted to be clamped by the set screw 37, so that the device may accommodate files of different sizes and lengths. The handle 38 of course, receives the shank 40 of the file 32, usually of tapered formation, therein as provided on most files, a three cornered file having such shank at the large end thereof being shown, although the file may be of any other desired cross-section or shape. The shank 40 of the file 32 thus extends through the reduced portion of the handle 38 upon which the ferrule 39 is mounted and the opposite end is adapted to engage the socketed head 41 of an arcuate or curved arm 42 which receives the reduced end portion 43 of the rod 29 adjacent the outer end thereof, which may be suitably flattened as indicated at 44, to be engaged by a set or wing screw 45 threaded through a bore in a sleeve 46 formed in the adjacent lower forward end of the arm 42 and capable of adjustment along the rod 29 at the flattened portion 44, so as to accommodate and tightly clamp files of different lengths, and maintain arm 42 in exact alignment with arm 34 and file 32 and rod 29 in exact parallel alignment.

Thus, the file 32 is slidably and pivotally supported, the same being adapted to slide back and forth longitudinally or lengthwise thereof and the guide rod 29, lengthwise of the file 32 and pivoted on a horizontal axis, as well as adapted to turn horizontally on the vertical axis or pivot 31, so that it may be turned to either of the positions shown in Figure 1 of the drawings in dotted and solid lines, for filing alternate teeth at opposite sides of the saw to the required bevel or hook determined by the pitch of the file set by the matched holes 21, 22, 23 and 24 aligned through the circular portions of the overhanging part 18 of the base 10 which pivotally supports the holder in spaced relation above the base, and the pivoted guide member 25, in any one of the positions of which it may be held by inserting a knurled pin 47 therein when the holes are in registry. The pin has a reduced shank 48 adapted to enter the holes and an intermediate portion 49 slightly larger than the shank 48, to rest on the top surface of the guide plate 25, to render the removal and insertion of the pin easier. The manner of swinging the guide on the rod 29 or ears 26 and 27 as a pivot, is clearly shown in Figures 3 and 4 of the drawings, from which it will be observed that the file 32 may be swung on either side of the pivot 31 and rod 29, or the device may be arranged on opposite sides of the saw to file upon either side, so that the oppositely bevelled teeth may be accurately filed by setting the pitch of the file at the required angle simply by removing the pin 47 and turning the file holder on the pivot 31 to the opposite side and reinserting pin 47 at the exact angle it had at the other side and as established for filing the teeth at the proper bevel. By using the guide rod 29 as the pivot, the device is merely turned or flopped over and lowered in an arc toward the point or tip end of the saw and then turned horizontally on the vertical pivot 31 by removing the pin 47 and reinserting it in the proper holes in the parts 18 and 28 when in registry in the reverse position with the file extending at an intersecting angle and at the required pitch, the angle at opposite sides being the same, so that the alternate teeth may be filed from opposite sides. This is due to the fact that the slidable support or guideway 25 is pivoted on the exact center of the slot, blade and base, as well as the file and guide rod. By means of the adjusting set screw or wing screw 37 at the file handle, the file may be set to the desired pitch so that in either instance, the file may be set at the proper angle at either side. By having the filing operation carried on from opposite sides of the saw and by leaving the base of the device in the same direction at all times, perfect opposite hand position is obtainable by having the center of the pivot and the guide rod on the exact same center as the center of the teeth and blade. If it is desired to lengthen the holder, this may be done at the ferrule of the handle and the arm 42 adjusted along the rod 29 at the flattened portion 44 by loosening the set screw 45 and moving the arm 42 accordingly so that the socketed end 41 will properly engage with the small or free end of the file, so that the file will be held tight. By having the file held firmly as described, in a horizontal position, the operator merely grasps the handle and moves the file back and forth after swinging the same down so that the file will engage the saw teeth of the blade, at either side, as shown in Figures 3 and 4 of the drawings, and reciprocating the device back and forth in the same manner as in hand filing. However, the device will result in accurate bevelling of the teeth, due to the fact that it is set accurately thereby leaving nothing to guesswork. In this way, exact bevelling is obtained by merely reversing the position of the file holder in either position at opposite sides of the blade. Also, you retain the same feel as in free hand filing, only the result is more perfect and the files last as long as with free hand filing. In addition, the guide is very light, the same without the file weighing less than ten ounces as ordinarily constructed.

While in the foregoing there has been shown and described the preferred embodiment of this invention it is to be understood that minor changes in the details of construction, combination and arrangement of parts may be resorted to without departing from the spirit and scope of the invention as claimed.

I claim as my invention:

A saw filing guide comprising a base in the form of a strip having a central longitudinal slot and upturned ends with enlarged openings communicating with the slot and adapted to rest on a saw clamp at opposite sides of a blade held therein and to straddle the blade for movement along its tooth edge as held in the clamp and projecting upwardly therefrom, a guide member pivoted on a vertical axis on one end of the base over the saw and centrally of the base and thickness of the saw, a file holder slidable in said guide member in line with said vertical pivot axis and pivoted on a horizontal axis across said vertical pivot axis, said file holder including a rod slidable in said guide member and adapted to swing laterally thereon as a horizontal pivot to either side of said horizontal and vertical axes, and means for clamping a file in said holder whereby the handle of the file forms a handle for moving the file back and forth with the rod sliding in the guide member from either side of the saw and means to hold the guide in adjusted position at corresponding angles at either side of the base and saw for filing alternate teeth from opposite sides including a pin and a number of apertures formed in said guide member and said base, a selected pair of which accommodate said pin.

RALPH A. MEASE.

REFERENCES CITED

The following references are of record in the file of this patent:

UNITED STATES PATENTS

| Number | Name | Date |
| --- | --- | --- |
| 268,940 | Roth | Dec. 12, 1882 |
| 409,866 | Penrose | Aug. 27, 1889 |
| 424,724 | Penrose | Apr. 1, 1890 |
| 599,327 | Foss | Feb. 22, 1898 |
| 648,932 | Duquemin | May 8, 1900 |
| 705,899 | Beck | July 29, 1902 |
| 1,223,191 | Merritt | Apr. 17, 1917 |
| 1,521,098 | Hilton | Dec. 30, 1924 |
| 1,666,395 | Miller | Apr. 17, 1928 |
| 1,923,446 | Loibl | Aug. 22, 1933 |